(12) United States Patent
Roodenburg et al.

(10) Patent No.: US 8,052,350 B2
(45) Date of Patent: Nov. 8, 2011

(54) SACRIFICIAL STINGER IMPACT ABSORBER

(75) Inventors: Joop Roodenburg, Delft (NL); Eric Romeijn, Zuid-Beijerland (NL)

(73) Assignee: Itrec B.V., Schiedam (NL)

( * ) Notice: Subject to any disclaimer, the term of this patent is extended or adjusted under 35 U.S.C. 154(b) by 328 days.

(21) Appl. No.: 12/373,259

(22) PCT Filed: Jul. 12, 2006

(86) PCT No.: PCT/NL2006/000358
§ 371 (c)(1),
(2), (4) Date: Mar. 6, 2009

(87) PCT Pub. No.: WO2008/007946
PCT Pub. Date: Jan. 17, 2008

(65) Prior Publication Data
US 2009/0279956 A1 Nov. 12, 2009

(51) Int. Cl.
*F16L 1/225* (2006.01)
(52) U.S. Cl. ............... 405/166; 405/168.2; 188/371; 188/376
(58) Field of Classification Search .............. 405/166, 405/168.2; 166/345, 346; 248/568, 569, 248/603; 188/371, 372, 374, 375, 376, 377
See application file for complete search history.

(56) References Cited

U.S. PATENT DOCUMENTS

| 3,736,760 | A | * | 6/1973 | Carstens et al. ............ 405/166 |
| 4,236,695 | A | | 12/1980 | Morrison |
| 6,488,434 | B1 | | 12/2002 | Graeff |
| 2005/0087731 | A1 | | 4/2005 | Scott |

FOREIGN PATENT DOCUMENTS

| EP | 1 063 163 A2 | 12/2000 |
| NL | 8 802 461 A | 5/1990 |
| WO | WO-2005/123566 A2 | 12/2005 |

* cited by examiner

*Primary Examiner* — John Kreck
*Assistant Examiner* — Sean Andrish
(74) *Attorney, Agent, or Firm* — Birch, Stewart, Kolasch & Birch, LLP

(57) ABSTRACT

A marine pipelaying vessel with a pipeline stinger connected to said vessel, preferably pivotable, and forming a downwardly directed support for pipeline to be laid. The vessel further includes a stinger suspension assembly between the stinger and the vessel from which the stinger is suspended at least during operation, preferably the stinger suspension assembly allowing to lower and raise said stinger. The stinger suspension assembly includes a sacrificial stinger impact absorber which is adapted to absorb impact energy resulting from a violent stinger motion, e.g. induced by a freak wave. Preferably, the impact absorber forms an elongatable structure, e.g. a telescopic structure, which is elongated under impact energy absorption.

14 Claims, 5 Drawing Sheets

SACRIFICIAL STINGER IMPACT ABSORBER

BACKGROUND OF THE INVENTION

1. Field of the Invention

The present invention relates to the field of marine pipelaying, wherein a pipeline is laid from an offshore vessel onto the seabed.

2. Description of Background Art

In this field is it known to use a pipeline supporting stinger to support the pipeline from the vessel into the water. The vessel can be of any suitable design, including a monohull vessel, a semi-submersible, a barge, etc. Often said stinger provides a curved or semi-curved path for the pipeline, e.g. when the pipeline is assembled or paid out in a generally horizontal direction from the vessel. The design of the stinger commonly depends on factors like the envisaged water depth, pipeline size and weight, pipeline properties (stiffness, material(s), possible coating, etc), pipeline tension during laying, etc.

For some years pipelaying has been done or at least proposed for deepwater, which has led to design of very large stingers which allow supporting the pipeline along a significant arc, up to an essentially 90 degrees arc, from horizontal. Stingers have been designed having a weight of more than 100 hundred tonnes, even several hundreds of tonnes. It is noted that the pipeline suspended between the stinger and the seabed also has a very significant weight, which load is carried by said stinger.

In WO 2005/123556 an example is shown of a pipelaying vessel having a stinger and an associated stinger suspension assembly. In said example the stinger suspension assembly is connected at one end to the foot of a very large crane on stern of the vessel. Several stinger suspension assemblies are proposed therein which are adapted to raise and lower the stinger.

In another known design it is known to arrange two cantilevers on the stern of the vessel, which project rearward above the water and each carry a winch with a cable from which the stinger is suspended.

Many prior art vessels having a stinger are designed for typical S-lay, wherein the vessel is provided with a pipeline-laying installation with one or more connecting stations, usually welding stations, for connecting pipe sections in a substantially horizontal orientation on a deck of the vessel. It is noted that stingers are also known on vessels for laying reeled pipeline, which pipeline to be laid is stored on one or more reels.

In the field of pipelaying the continuity of the pipelaying process is a prime factor. The weather and associated wave conditions generally form a limitation on the continuity as pipelaying has to be suspended under certain unfavourable conditions in order not to compromise the pipeline and/or the pipeline installation system.

SUMMARY OF THE INVENTION

The present invention aims to provide an improved pipelaying vessel.

The present invention achieves said aim by providing a vessel with a pipeline stinger pivotably connected to said vessel and forming a downwardly directed support for pipeline to be laid, wherein said vessel comprises a stinger suspension assembly between said stinger and said vessel from which said stinger is suspended at least during operation, wherein the stinger suspension assembly includes a sacrificial stinger impact absorber which is adapted to absorb impact energy resulting from a violent stinger motion, e.g. induced by a freak wave.

The invention is based on the insight that by providing one or more specially designed sacrificial stinger impact absorbers a freak wave incident or the like will potentially only result in the destruction of the (frangible members of the) absorber while the remainder of the stinger and stinger suspension assembly (as well as any anchoring points on the vessel and the stinger) are designed to remain intact.

It is known that a freak wave can occur even under relatively calm conditions, so that no precautions can be taken (e.g. changing heading of the vessel, suspending) to counter the effect of the freak wave. A freak wave can e.g. have a wave height of about 10 meters, with the effect that the passage of the wave will throw the stinger up and down violently. Without sacrificial absorber extensive damage must be feared which reduces the operational efficiency of the vessel. The use of a sacrificial absorber compared to e.g. a fluidic shock absorber based on fluid pressure or fluid flow (restriction) is advantageous in view of the costs for an absorber which has to absorb the enormous impact caused by a violent motion of a stinger.

Preferred embodiments of the vessel and in particular of the impact absorber are disclosed in the appended claims and in the description which follows.

DETAILED DESCRIPTION OF THE PREFERRED EMBODIMENTS

Figure 1A:
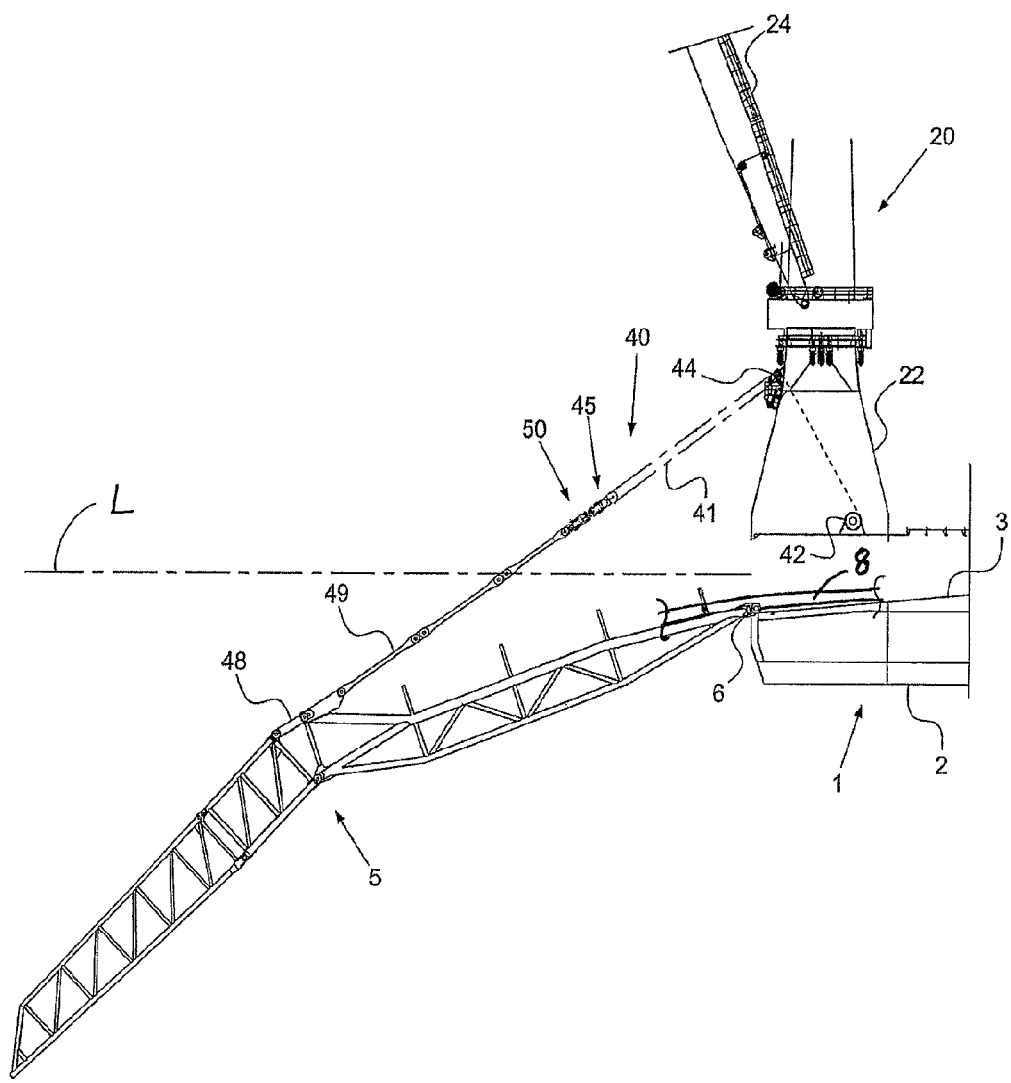
FIG. 1A diagrammatically depicts a part of an offshore vessel with a stinger, which vessel is suitable, inter alia, for laying a pipeline on the seabed, FIG. 1B in a view from above depicts the arrangement of the two impact absorbers with the common yoke in the embodiment of FIG. 1A, FIG. 2A in a view from above depicts the yoke of FIG. 1A with the two absorbers.

FIG. 1A shows a stern part of an offshore vessel 1 which is suitable, inter alia, for laying a pipeline on the seabed. The vessel 1 has a hull 2 with a working deck 3. The vessel 1 here is provided with a pipeline-laying installation of the S-lay type, with one or more welding stations (not shown) on the working deck 3, for coupling pipeline sections in a substantially horizontal orientation. On the working deck 3 there are also what are known as tensioners (not shown) for carrying the weight of the pipeline which is hanging downwards from the vessel to the seabed.

Furthermore, the vessel 1 has a stinger 5 which projects outside the hull 2 of the vessel 1 at the rear side of the vessel 1, engages on the hull 2 at an engagement point such that it can pivot about a substantially horizontal pivot structure 6 and forms a downwardly curved support for pipeline 8 (a part is depicted only) moving towards the seabed. Furthermore, the vessel 1 has a hoisting crane 20, disposed in the vicinity of the same side of the hull as the stinger 5, which hoisting crane 20 has a vertical structure fixed to the hull 2. Here, the crane 20 is disposed above the location where the pipeline 8 leaves the working deck 3, on the longitudinal axis L of the vessel 1.

The hoisting crane 20 here has a substantially hollow vertical column with a foot 22, which in this case is fixed to the hull 2 of the vessel 1. The hoisting crane 20 has a jib 24.

Figure 1B:
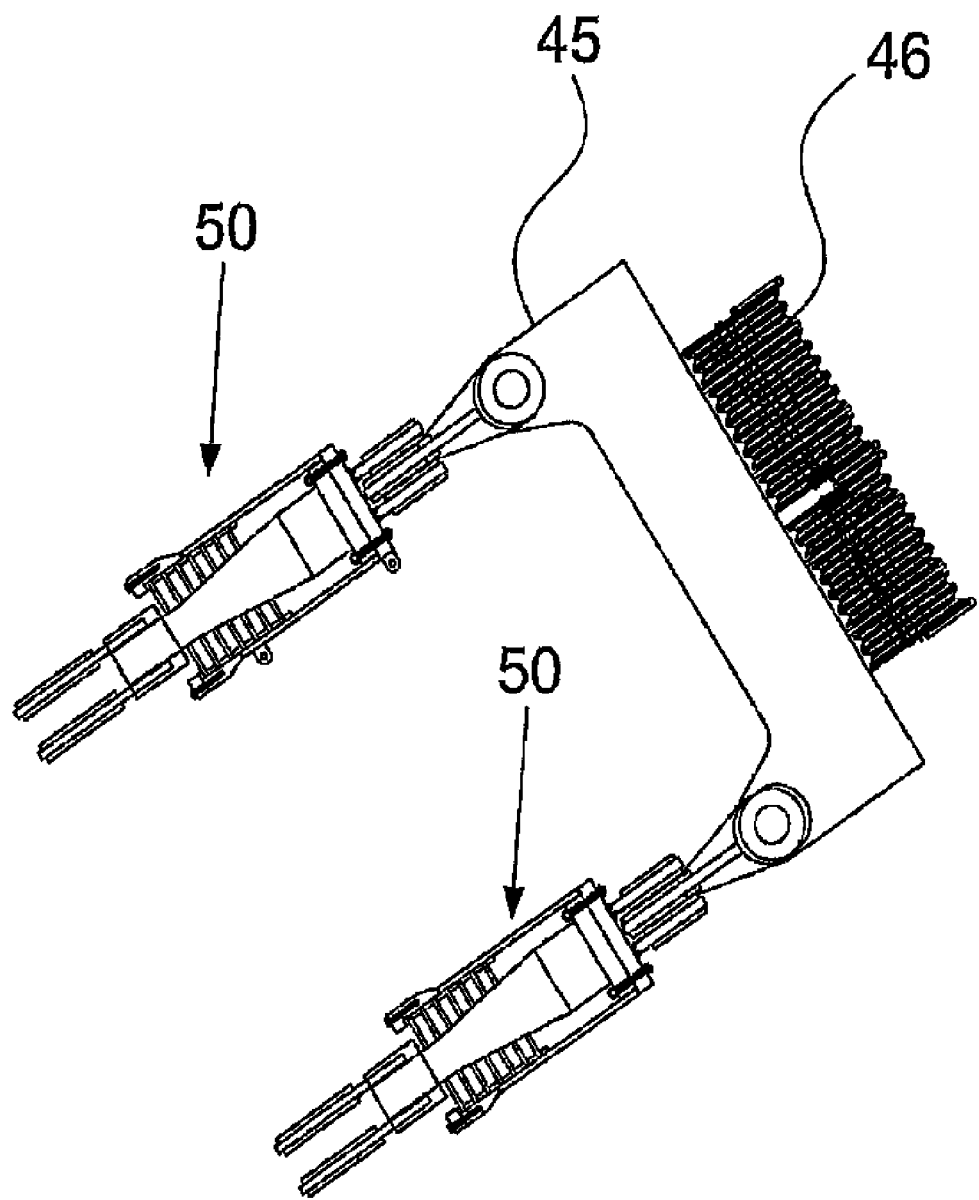

The foot 22 of the column here is substantially rectangular, which has the advantage that the foot 22 can easily be secured (by welding or using bolts) to the longitudinal and cross bulkheads of the hull 2 of the vessel 1. In a variant which is not shown, the vertical column is partly or completely a framework of bars It can be seen from FIG. 1 that a stinger suspension assembly 40 is arranged between the stinger 5 and the vessel 1 from which the stinger 5 is suspended at least during pipelaying operation.

The stinger suspension assembly 40 allows to lower and raise the stinger 5 in order to adjust the shape of the support path for the pipeline 8 provided by the stinger 5.

In this example the suspension assembly 40 includes a winch and cable system with one or more cables 41 and with one or more winches 42 that are arranged on the vessel, here in the vicinity of lower end of the foot of the crane 20. The cables 41 here extend over cable sheave assemblies 44 on the upper end of the foot 22 of the crane 20 to a common yoke 45 or spreader provided with a cable sheave assembly 46.

Between one or more (here two) anchoring points 48 on the stinger 5 and the common yoke 45 further fixed length cables 49 extend.

In addition, here between the cables 49 and the common yoke 45, sacrificial stinger impact absorbers 50 are arranged.

As will be appreciated, operating the winches 42 allows to adjust the effective length of the stinger suspension assembly 40 and thus to adjust the position of the stinger 5.

As an alternative for the cable system, a system including (hydraulic) adjusters could be arranged, e.g. including hydraulic jacks. Again, it is proposed to include one or more sacrificial stinger impact absorbers 50 between or at the stinger anchoring point and the vessel anchoring point of the stinger suspension assembly.

The sacrificial stinger impact absorbers 50 are identical here. They are each specially designed to absorb impact energy resulting from a violent stinger motion, e.g. induced by a freak wave as explained above. Due to the enormity of the weight of the stinger each absorber 50 in itself can have a weight of several tonnes. The absorbers of the design shown here have a length of about 3 meters and a weight of about 9 tonnes.

The impact absorber 50 has a first connector member 51 and second connector member 52 for attaching said impact absorber to said vessel, here to the common yoke 45, and to stinger 5.

Figure 2A:
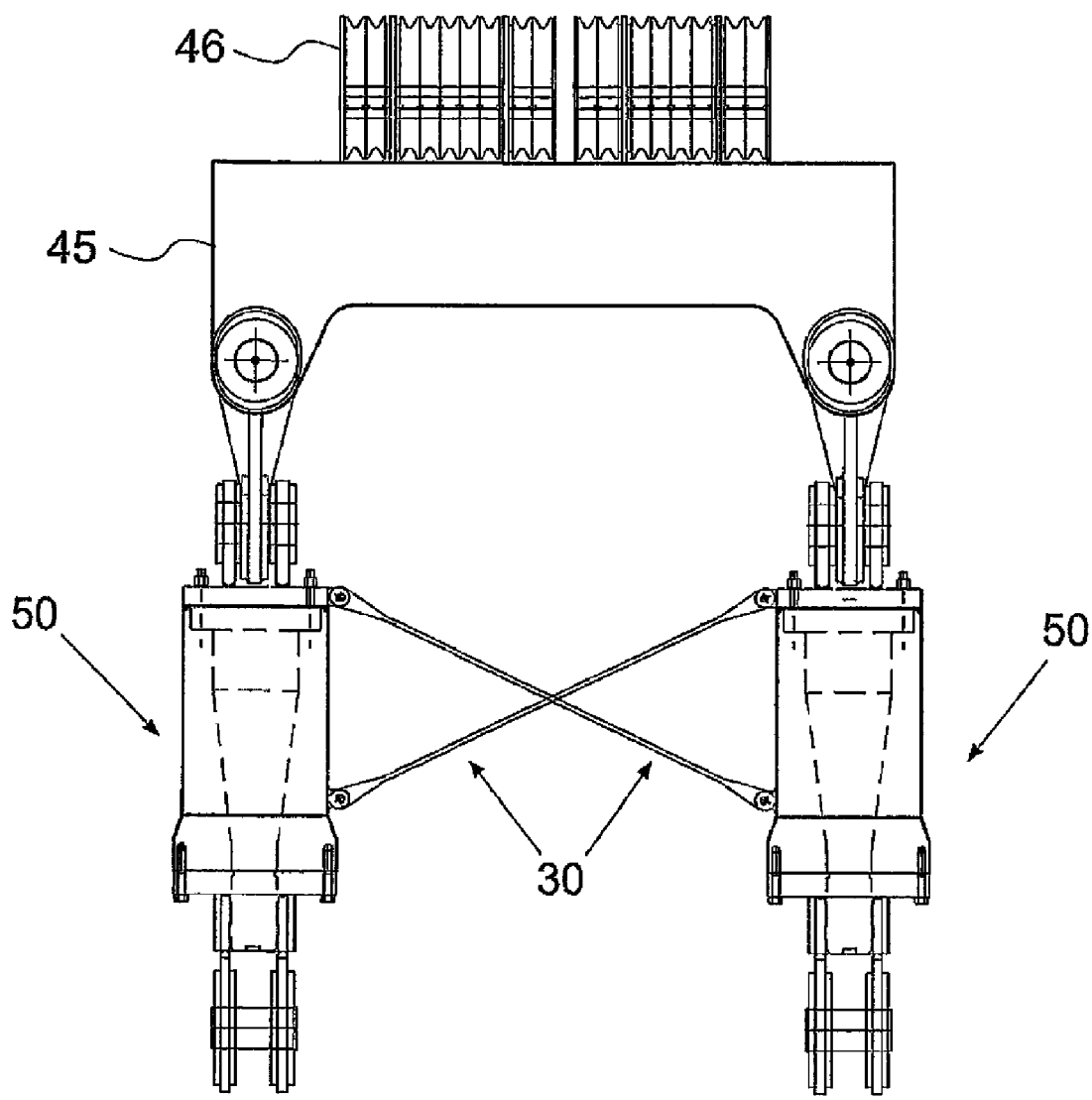
FIG. 2B depicts the two absorbers of FIG. 2A in a front view.
Figure 2B:

In FIG. 2 temporary links 30 are mounted between the absorbers 50. These links 30 are in practice arranged to avoid sway of the absorbers 50 as the vessel is sailing to a location.

The impact absorber 50 forms an elongatable structure, here a telescopic structure, which is elongated under impact energy absorption. In the example shown here the absorber 50 lengthens about 1 meter when a violent stinger motion occurs as will be explained in detail below.

The first connector member 51 includes a tubular housing 51a and an end cap 53 at one end of said tubular housing 51a. An eye 55, formed by adjacent plates here, is attached to said end cap 53.

The second connector member 52 includes a piston part 54 slidable or telescopically received within said tubular housing 51a. An eye 56, formed by adjacent plates here, is connected to said piston part 54.

Figure 3A:
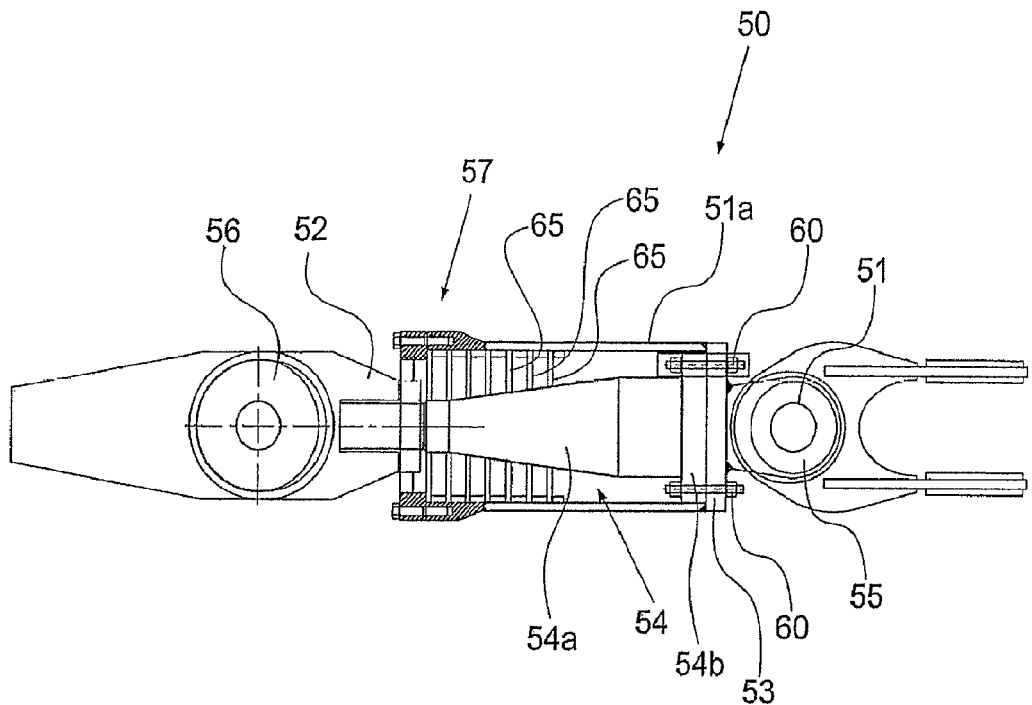
FIG. 3A depicts in cross-section an impact absorber of the present invention.
Figure 3B:
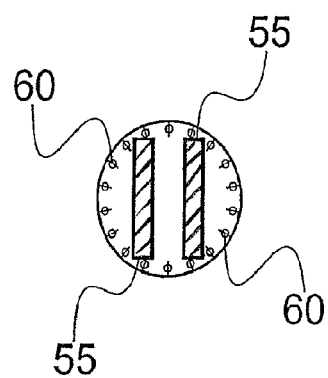
FIG. 3B depicts a cross-section of the eye 55 of the present invention.
Figure 3C:
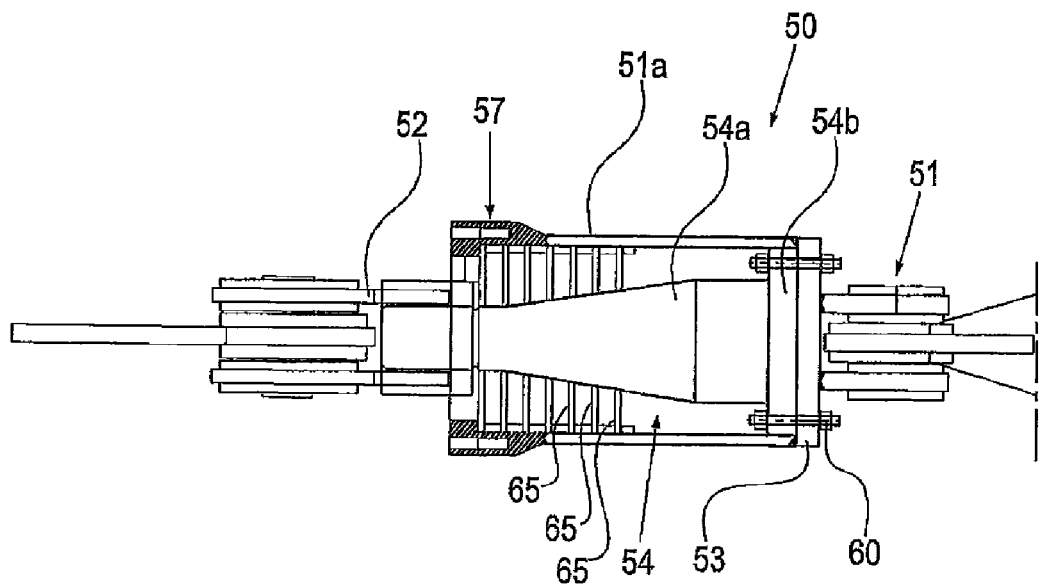
FIG. 3C depicts a cross-section of the impact absorber of the present invention.
Figure 4:
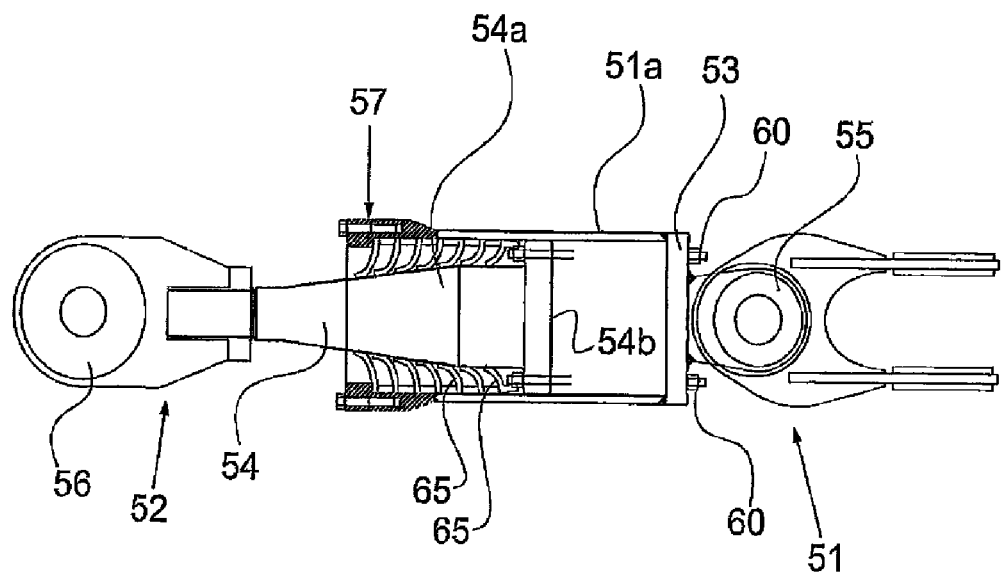
FIG. 4 depicts a cross-section of the impact absorber of the present invention after impact energy absorption has occurred.

As is shown in FIG. 3A and FIG. 3B, the piston part 54, here via a flange 54b at the side facing the end cap 53, is fixed to said first member 51 (here to the end cap 53 thereof) via one or more frangible fixations, here a series of break bolts 60 designed to break at a predetermined load on the bolts 60. The threshold for breaking said frangible fixations is chosen such that under normal operation said fixations will remain intact and the impact absorber 50 essentially functions as a rigid element in the stinger suspension assembly 40.

As can be seen in the figures, the piston part 54 has a tapering, here conical, section 54a tapering in the direction of elongation of the absorber 50.

In the tubular housing 51a a series of sacrificial members is arranged, essentially between the first and second connector members 51, 52 and adapted to plastically deform to absorb impact energy.

The sacrificial members here are embodied as a series of deformable annular members 65 arranged at intervals along the tubular housing 51a. In total seven of such members 65 are shown in this example.

The annular sacrificial members 65 are embodied here as planar steel discs (e.g. having a thickness of several centimeters each) but other shapes can be envisaged as well. Each disc 65 has an opening therein through which said piston part 54 extends, said discs 65 deforming plastically as said piston 54 is moved with respect to the tubular housing 51a upon impact absorption.

As can be seen in the figures multiple annular members 65 are arranged adjacent the conical section 54a and these members have an opening therein with a diameter adapted to the diameter of the conical section 54a at said location. Preferably, a slight play is present between the discs 65 and the conical section 54a so that the break bolt 60 function is not interfered with.

The discs 65 are removably mounted within the tubular housing 51a, here the first connector member 51 includes an annular end cap 57 removably attached to the tubular housing 51a and having an opening therein through which said piston part 54a extends. This allows to replace the discs 65 after having been subjected to plastic deformation. It will be understood that the first and second connector members 51, 52 are designed to maintain intact upon impact energy absorption by said absorber 50. As such, the "link" provided by the stinger suspension assembly between the vessel and the stinger will also remain intact, only the absorber 50 will have an increased length.

In view of the enormous impact to be absorbed and in view of costs it is preferred that the sacrificial members 65 are of metal, preferably steel, but other materials, e.g. (reinforced) plastics, can be envisaged as well.

It will be understood that instead of break bolts, other frangible fixations can be employed.

The invention claimed is:

1. A marine pipelaying vessel with a pipeline stinger pivotably connected to said vessel and forming a downwardly directed support for pipeline to be laid, wherein said vessel comprises a stinger suspension assembly between said stinger and said vessel from which said stinger is suspended at least during operation, said stinger suspension assembly including a sacrificial stinger impact absorber adapted to absorb impact energy resulting from a violent stinger motion, and wherein said impact absorber has a first connector member and a second connector member for attaching said impact absorber to said vessel and said stinger, respectively, and wherein said first connector member includes a tubular housing and wherein said second connector member includes a piston within said tubular housing, and wherein said first connector member includes an end cap at one end of said tubular housing, said piston being fixed to said end cap via one or more frangible fixations having a load threshold for breaking, said one or more fixations remaining intact during normal operation of the vessel such that the impact absorber functions as a rigid element in the stinger suspension assembly, and wherein a series of sacrificial members is arranged at intervals in the tubular housing, said sacrificial members being embodied as deformable annular members having an opening therein through which said piston extends, and wherein, upon the violent stinger motion causing a load on the one or more frangible fixations above said load threshold, the frangible fixations break, thus releasing the piston, and said sacrificial members being deformed plastically as said piston moves with respect to the tubular housing.

2. The vessel according to claim 1, wherein said one or more frangible fixations are break bolts.

3. The vessel according to claim 1, wherein said deformable annular members are steel discs having an opening therein through which said piston extends.

4. The vessel according to claim 3, wherein said one or more annular sacrificial members are mounted removably within said tubular housing, said first connector member including an annular end cap removably attached to said tubular housing and having an opening therein through which said piston extends.

5. The vessel according to claim 1, wherein the piston has a tapering section tapering in the direction of elongation of the impact absorber, and wherein said multiple annular sacrificial members are arranged at intervals adjacent said tapering section.

6. The vessel according to claim 5, wherein said sacrificial members each have an opening with a diameter adapted to a diameter of the tapering section at each of the intervals.

7. A marine pipelaying vessel with a pipeline stinger pivotably connected to said vessel, and forming a downwardly directed support for pipeline to be laid, wherein said vessel comprises a stinger suspension assembly between said stinger and said vessel from which said stinger is suspended at least during operation, said stinger suspension assembly including a sacrificial stinger impact absorber which is adapted to absorb impact energy resulting from a violent stinger motion, and wherein said impact absorber has a first connector member and a second connector member for attaching said impact absorber to said vessel and said stinger, respectively, and wherein said first connector member includes a tubular housing and wherein said second connector member includes a piston within said tubular housing, and wherein a series of sacrificial members is arranged at intervals in the tubular housing, said sacrificial members being embodied as deformable annular members having an opening therein through which said piston extends, and wherein the piston has a tapering section tapering in the direction of elongation of the impact absorber, and wherein said multiple annular sacrificial members are arranged at intervals adjacent a conical part, wherein said sacrificial members each have an opening with a diameter adapted to a diameter of the tapering section at a location.

8. The vessel according to claim 7, wherein said first connector member includes an end cap at one end of said tubular housing, said piston being fixed to said end cap via one or more frangible fixations having a load threshold for breaking, said one or more fixations remaining intact during normal operation of the vessel such that the impact absorber functions as a rigid element in the stinger suspension assembly, and wherein, upon the violent stinger motion causing a load on the one or more frangible fixations above said load threshold, the one or more frangible fixations break, thus releasing the piston and said sacrificial members being deformed plastically as said piston moves with respect to the tubular housing.

9. The vessel according to claim 7, wherein said one or more frangible fixations are break bolts.

10. The vessel according to claim 7, wherein said deformable annular members are steel discs having an opening therein through which said piston extends.

11. The vessel according to 10, wherein said one or more annular sacrificial members are mounted removably within said tubular housing, said first connector member including an annular end cap removably attached to said tubular housing and having an opening therein through which said piston extends.

12. A marine pipelaying vessel with a pipeline stinger pivotably connected to said vessel, and forming a downwardly directed support for pipeline to be laid, wherein said vessel comprises a stinger suspension assembly between said stinger and said vessel from which said stinger is suspended at least during operation, said stinger suspension assembly including a sacrificial stinger impact absorber which is adapted to absorb impact energy resulting from a violent stinger motion, and wherein said impact absorber has a first connector member and a second connector member for attaching said impact absorber to said vessel and said stinger, respectively, and wherein said first connector member includes a tubular housing and wherein said second connector member includes a piston within said tubular housing, and wherein said first connector member includes an end cap at one end of said tubular housing, said piston being fixed to said end cap via one or more frangible fixations having a load threshold for breaking, said one or more fixations remaining intact during normal operation of the vessel such that the impact absorber functions as a rigid element in the stinger suspension assembly, and wherein one or more sacrificial members are arranged between the tubular housing and the piston, and wherein, upon the violent stinger motion causing a load on the one or more frangible fixations above said load threshold, the one or more frangible fixations break, thus releasing the piston and said sacrificial members being deformed plastically as said piston moves with respect to the tubular housing.

13. The vessel according to claim 12, wherein said one or more sacrificial members are embodied as deformable annular members having an opening therein through which said piston extends.

14. The vessel according to claim 12, wherein the piston has a tapering section tapering in the direction of elongation of the impact absorber, and wherein said multiple annular sacrificial members are arranged at intervals adjacent a conical part, wherein said sacrificial members each have an opening with a diameter adapted to a diameter of the tapering section at a location.

* * * * *